UNITED STATES PATENT OFFICE.

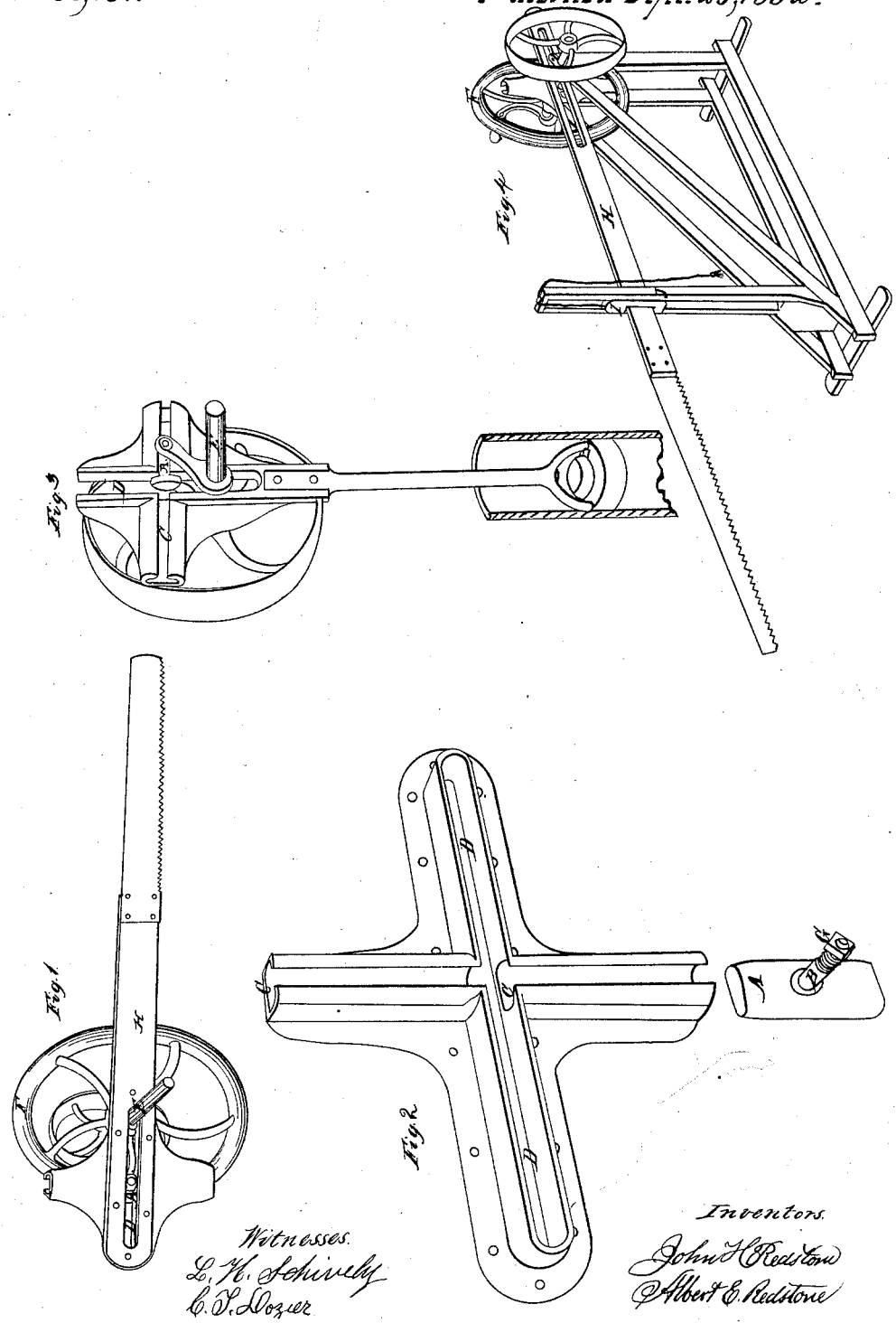

JOHN H. REDSTONE AND ALBERT E. REDSTONE, OF INDIANAPOLIS, INDIANA, ASSIGNORS TO THEMSELVES AND JAMES M. RAY, OF SAME PLACE.

IMPROVEMENT IN CHANGING A ROTARY INTO A RECIPROCATING MOTION.

Specification forming part of Letters Patent No. 35,131, dated April 29, 1862.

*To all whom it may concern:*

Be it known that we, JOHN H. REDSTONE and ALBERT E. REDSTONE, of Indianapolis, in the county of Marion and State of Indiana, have invented a new and useful Improvement in Devices for Changing a Rotary to a Reciprocating Movement or a Reciprocating to a Rotary Movement, being a substitute for the crank, connection-rod, and cross-head; and we do hereby declare that the following is a full and exact description of the same, reference being had to the accompanying drawings and the letters marked thereon.

Figures 1, 2, 3, and 4 show the construction and operation of the device.

Fig. 1 shows the device as arranged for operating a saw. The bar H, on the end of which the saw is attached, has a slot to correspond with the slot D, and, being bolted fast to the device, forms a continuation of the slot D, through which the shaft E passes. The arm of the fly-wheel F forms the crank. The wrist B, as shown in Fig. 2, passing through the same, is secured by the nut G, so as to allow it to revolve in the slide A. The slide A, as shown in Fig. 1, is in the center of the slot D, being at the extreme back-stroke of the crank. As the wheel F is revolved forward, the slide A passes up in the groove C, pressing against the forward side of the same, carrying the saw-bar H forward. When the wheel has made one-fourth of a revolution, the slide A has reached its greatest elevation and the groove C stands across the shaft or axle E. As it passes to one-half of a revolution, the slide A has passed down to the center or intersection of the groove C and slot D, and is in the same position in the forward part of the stroke as it stood in the position of starting—one-half revolution back. The rear end of the slot D is then close to the axle or shaft E, and the saw-bar is thrown to the full extent of its forward stroke. Another fourth of a revolution brings the slide A to the lower part of the groove C, when one-half of the back-stroke is made, when the slide A rises to the first position or starting-point, as shown in Fig. 1.

Fig. 2 shows the device free from any attachment. A is a slide to which the wrist B is attached. C is a groove with side projections covering the slide A and leaving an opening or passage for the wrist B. The slot or guide D is designed to slide upon the axle, as shown by E in Fig. 2, and is operated as the crank is revolved, and the slide A passes up and down in the groove C and is revolved around the shaft E.

Fig. 3 shows the device arranged for operating a pump, the slot D being open at the top for the purpose of placing it upon a shaft which cannot readily be taken down. A corresponding variation must be made in the attachment of the crank, so that the shaft need not be removed in order to attach the same.

Fig. 4 shows a complete portable machine for crosscut or drag saw operated by this device. The saw-bar H passes through the gate I, which operates in the guide-frame J for the purpose of holding the saw steady while it is lowered or raised in the operation of sawing.

The advantage of this device for sawing will be seen in the fact that while it serves the purpose of producing the straight line effected by the cross-head it adapts itself to the cut of the saw as it descends in sawing, always preserving a straight motion over the cut, thus avoiding the long attachment which is used in connection with the cross-head and pitman for the purpose of compensating for the change in the angle of the saw as it cuts down, and to prevent the rocking movement of the saw in the lever attachment, which is produced by the rising and fall of the saw as it passes through the arc of its vibration forward and back.

By this device we have accomplished what has never been accomplished by any other arrangement. In cutting shingle-blocks for our shingle-cutting machine we rip them out with the same saw with which we crosscut the logs and with the same velocity with which we can cut with several horse-power using a circular saw, while we use less than one horse-power with our drag-saw.

What we claim, and desire to secure by Letters Patent, is—

The combination, in the manner described, of the groove C, slot D, and slide A, when operated substantially as set forth.

JOHN H. REDSTONE.
ALBERT E. REDSTONE.

Witnesses:
L. H. SCHIVELY,
C. T. DOZIER,